United States Patent
Iyer et al.

(10) Patent No.: US 9,445,395 B1
(45) Date of Patent: Sep. 13, 2016

(54) SUPPRESSING ALERT MESSAGES BASED ON MICROPHONE STATES OF CONNECTED DEVICES

(71) Applicant: Motorola Mobility LLC, Chicago, IL (US)

(72) Inventors: Boby Iyer, Elmhurst, IL (US); Jonathan E Eklund, Libertyville, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/740,662

(22) Filed: Jun. 16, 2015

(51) Int. Cl.
*H04M 3/00* (2006.01)
*H04W 68/02* (2009.01)
*H04W 68/00* (2009.01)
*H04W 8/24* (2009.01)

(52) U.S. Cl.
CPC ........... *H04W 68/02* (2013.01); *H04W 68/005* (2013.01); *H04W 8/245* (2013.01)

(58) Field of Classification Search
CPC ............... H04W 66/04; H04W 8/245; H04M 1/72519; H04M 19/04
USPC ............................. 455/458, 567, 418, 550.1
See application file for complete search history.

(56) References Cited

U.S. PATENT DOCUMENTS

| | | | | |
|---|---|---|---|---|
| 6,774,786 B1* | 8/2004 | Havekost | ........... | G05B 23/0272 340/500 |
| 9,262,785 B1* | 2/2016 | Jocke | ..................... | G07F 19/203 |
| 2002/0022894 A1* | 2/2002 | Eryurek | ................ | G03F 7/0007 700/80 |
| 2007/0300227 A1* | 12/2007 | Mall | ..................... | G06F 9/3851 718/102 |
| 2010/0093405 A1* | 4/2010 | Ewell, Jr. | ................ | H04M 1/66 455/566 |
| 2010/0128611 A1* | 5/2010 | Deguchi | ............. | H04L 41/0686 370/242 |
| 2011/0130132 A1* | 6/2011 | Lipovski | ........... | H04M 1/72552 455/418 |
| 2012/0188067 A1* | 7/2012 | Xiao | ..................... | B60R 25/102 340/426.18 |
| 2012/0188467 A1* | 7/2012 | Escuti | .................. | G02B 27/286 349/1 |
| 2013/0316686 A1* | 11/2013 | Subbaramoo | ......... | H04W 12/02 455/418 |
| 2014/0176665 A1* | 6/2014 | Gottlieb | .................. | H04N 7/15 348/14.08 |
| 2014/0214979 A1* | 7/2014 | Turakhia | ............. | H04L 12/1895 709/206 |
| 2014/0229866 A1* | 8/2014 | Gottlieb | ................ | H04L 65/403 715/758 |
| 2014/0321664 A1* | 10/2014 | Huang | ................. | H04R 29/005 381/92 |
| 2014/0368601 A1* | 12/2014 | deCharms | ............. | H04W 4/021 348/14.02 |
| 2015/0163626 A1* | 6/2015 | Zimmer | ................. | H04W 4/22 455/404.2 |

OTHER PUBLICATIONS

Boby Iyer, et al., "Queueing Voice Assist Messages During Microphone Use", U.S. Appl. No. 14/740,644, filed Jun. 16, 2015.

\* cited by examiner

*Primary Examiner* — Danh Le
(74) *Attorney, Agent, or Firm* — Amerson Law Firm, PLLC

(57) ABSTRACT

A method includes generating an alert message in a device. The device is one of a plurality of connected devices. The alert message is suppressed in the device responsive to a state of a microphone of any of the plurality of connected devices indicating an active state. A device includes a microphone, a speaker, and a processor coupled to the microphone and the speaker. The processor is to generate an alert message and suppress the alert message responsive to a state of a microphone of any of a plurality of connected devices including the device indicating an active state.

20 Claims, 3 Drawing Sheets

SUPPRESSING ALERT MESSAGES BASED ON MICROPHONE STATES OF CONNECTED DEVICES

BACKGROUND

1. Field of the Disclosure

The disclosed subject matter relates generally to mobile computing systems and, more particularly, to suppressing alert messages based on microphone states of connected devices.

2. Description of the Related Art

Various alert techniques are used in mobile devices to inform users of incoming activity, including text messages, email messages, voice calls, video conference calls, etc. Alert tones, vibrations, or voice alerts may be used to indicate incoming events.

One type of alert mechanism is commonly referred to as voice assist. To facilitate safer user interactions during activities, such as driving, a voice assist service typically announces an incoming activity and queries the user for a response. For example, the voice assist service may announce, "You have an incoming text message from John Doe. Would you like me to read it?" or "You have an incoming call from Jane Doe. Would you like me to answer it?"

In some instances, a user may be engaged in activity where such incoming alert tones or messages may be disruptive or may reduce privacy. For example, the user may be engaged in a voice call or video conference, and an incoming voice assist message may be heard by other parties participating in the communication. The user may not want the information in the text message or the party associated with the incoming alert to be made known. In other cases, the user may be recording video, and the incoming alert message may be recorded along with the video, thereby causing unwanted content being permanently present in the video.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
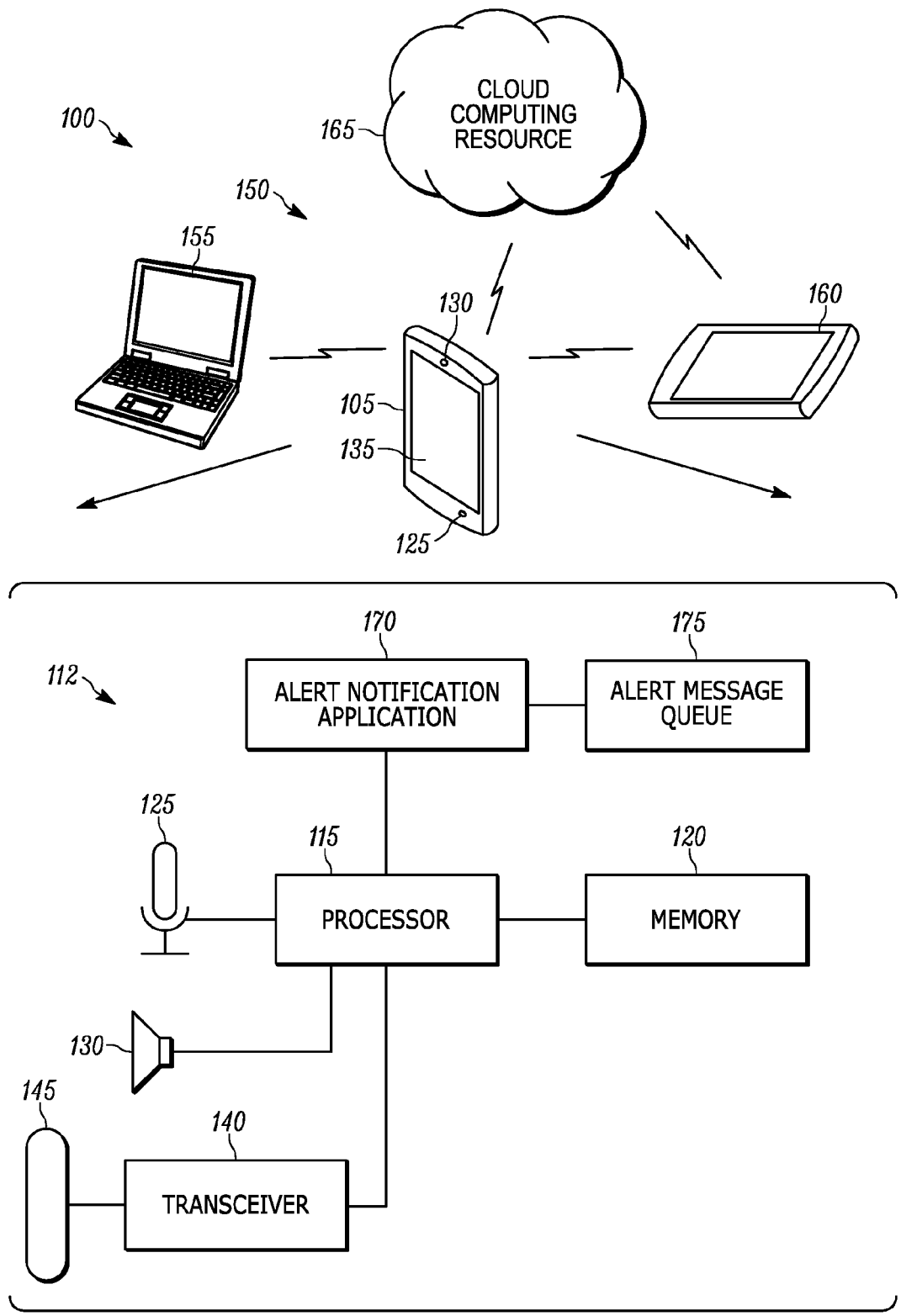
FIG. 1 is a simplified block diagram of a communication system for detecting audio alert events, according to some embodiments disclosed herein.
Figure 2:
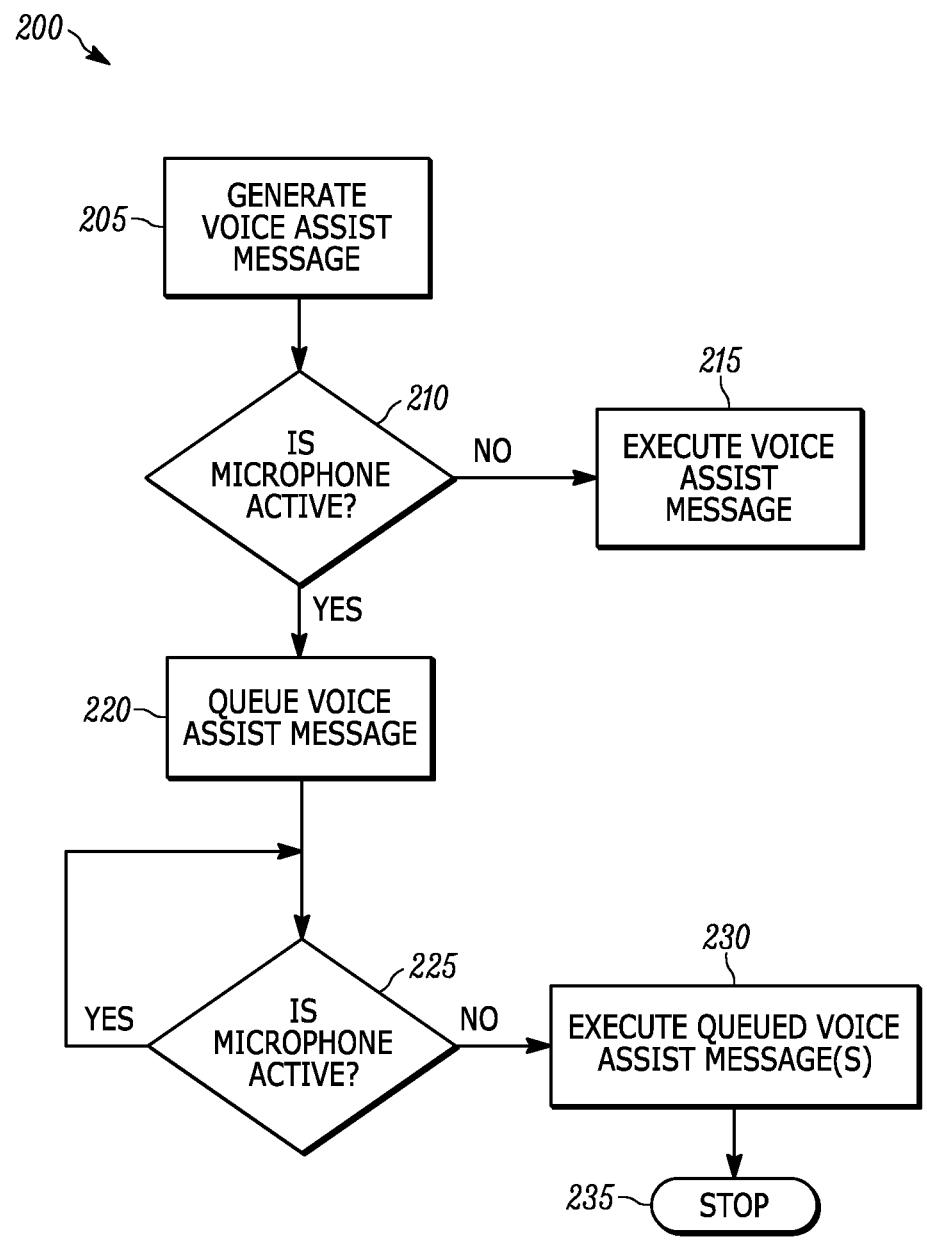
FIG. 2 is a flow diagram of a method for queuing voice assist messages during microphone use, according to some embodiments disclosed herein.
Figure 3:
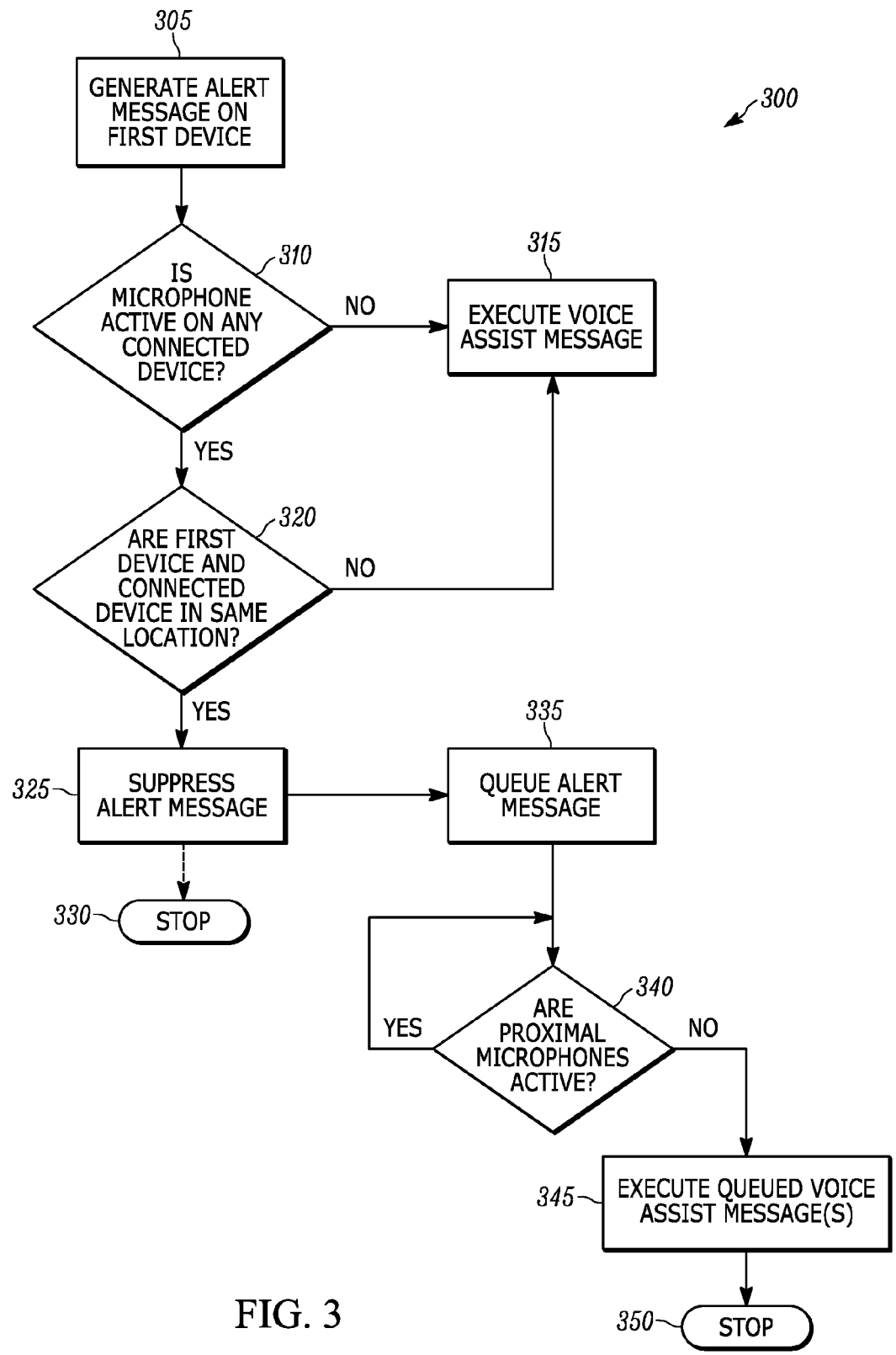
FIG. 3 is a flow diagram of a method for suppressing alert messages during microphone use across a plurality of connected devices, according to some embodiments disclosed herein.

FIGS. 1-3 illustrate example techniques for queuing or suppressing alert messages, including voice assist messages during periods of microphone use for a given device or across a plurality of connected devices. To enhance privacy and/or to reduce interference with a user's current activity, voice assist messages may be suppressed or queued during periods of microphone use. In embodiments with multiple connected device, all alert messages, including voice assist messages, may be suppressed for a given device or devices if another one of the devices has its microphone in use.

FIG. 1 is a simplistic block diagram of a communications system 100 including a first device 105. The first device 105 implements a computing system 112 including, among other things, a processor 115, a memory 120, a microphone 125, a speaker 130, and a display 135. The memory 120 may be a volatile memory (e.g., DRAM, SRAM) or a non-volatile memory (e.g., ROM, flash memory, hard disk, etc.). The first device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, etc. The communication link 150 may have a variety of forms. In some embodiments, the communication link 150 may be a wireless radio or cellular radio link. The communication link 150 may also communicate over a packet-based communication network, such as the Internet.

As illustrated in FIG. 1, the first device 105 may be one of a plurality of connected devices 105, 155, 160. The other connected devices 155, 160 may also include a computing system having some or all of the entities in the computing system 112 of the first device 105, such as a processor, a memory, and a transceiver. Any number of connected devices of different types may be included when using the method and systems disclosed herein. In various embodiments, the devices 105, 155, 160 may be embodied in handheld or wearable devices, such as a laptop computers, handheld computers, tablet computers, mobile devices, telephones, personal data assistants, music players, game devices, wearable computing devices, and the like. One or more of the connected devices 155, 160 could also be a non-portable device, such as a desktop computer. For example, the device 155 may be a laptop computer and the device 160 may be a tablet computer. To the extent certain example aspects of the devices 105, 155, 160 are not described herein, such example aspects may or may not be included in various embodiments without limiting the spirit and scope of the embodiments of the present application as would be understood by one of skill in the art.

In one embodiment, a cloud computing resource 165 may interface with the devices 105, 155, 160 to facilitate the exchange of state information across some or all of the devices 105, 155, 160. In one illustrative embodiment, the shared state information may include information such as, for example, location information and activity state information, such as microphone usage state, etc. The state information may be used to selectively suppress or queue alert messages across some or all of the connected devices 105, 155, 160, as described in greater detail herein. In some embodiments, the first device 105 may poll the other devices 155, 160 or the cloud computing resource 165 to access the state information. In other embodiments, the devices 105, 155, 160 may periodically broadcast their state information to the other devices and/or the cloud computing resource 165.

In the first device 105, the processor 115 may execute instructions stored in the memory 120 and store information in the memory 120, such as the results of the executed instructions. Some embodiments of the processor 115, the memory 120, and the microphone 125 may be configured to implement an alert notification application 170 and perform portions of the methods 200, 300 shown in FIGS. 2 and 3 and discussed below. For example, the processor 115 may execute the alert notification application 170 to detect and suppress the messages or, alternatively, queue the alert messages in an alert message queue 175. In one example, the alert notification application 170 may be part of a voice assist application or feature of the device 105. One or more aspects of the methods 200, 300 may also be implemented using the cloud computing resource 165 in addition to the alert notification application 170.

FIG. 2 is a flow diagram of an illustrative method 200 for queuing voice assist messages during periods of microphone usage, in accordance with some embodiments disclosed herein. In general, one or more of the devices 105, 155, 160 may be capable of implementing various elements of the method 200 shown in FIG. 2. In one example, various elements of the method 200 may be implemented on the first device 105. In some embodiments, the cloud computing resource 165 (see FIG. 1) may also be used to perform one or more elements of the method 200.

In method block 205, a voice assist message is generated. For example, the voice assist message may be generated based on the alert notification application 170 identifying an incoming email, text message, telephone call, video call, or other event that is configured to be handled by sending a voice assist message to the user. For example, the voice assist message may be implemented by a voice engine in the alert notification application 170 that states, "You have an incoming text message from John Doe. Would you like me to read it?" or "You have an incoming call from Jane Doe. Would you like me to answer it?"

In method block 210, the microphone state of the device 105 is evaluated to determine if the microphone is active. If the microphone 125 is not active in method block 210, the voice assist message is executed in method block 215. In some embodiments, executing the voice assist message may include playing the voice assist message using the speaker 130 and listening for a user response using the microphone 125 (i.e., for voice assist messages that also query the user for input). The execution of the voice assist message may also include voicing connect associated with the voice assist message, such as the content of the email. In a case where the queued voice assist message was related to an immediate event, such as an incoming communication request (e.g., phone call or video call), the voice assist message may be altered when executed. For example, the voice assist message may be changed as follows: "You had an incoming call from Jane Doe. Would you like to return the call?"

If the microphone 125 is active in method block 210, the voice assist message is queued in method block 220 (i.e., in the alert message queue 170 of FIG. 1).

The usage state of the microphone 125 is monitored in method block 225 until it becomes inactive. Other new incoming voice assist messages may also be stored in the queue 170 during the monitoring of method block 225. The microphone state may be monitored periodically (e.g., every N seconds).

When the microphone 125 is detected as being inactive in method block 225, any voice assist messages in the queue 170 are executed in method block 230. In some embodiments, the user may be queried after the microphone state is determined to be inactive in method block 225 as to whether the queued voice assist messages should be executed immediately or held for an additional time period. A delay may be inserted between the queued messages as they executed to allow for the user to be queried and each voice assist event to be addressed according to the input. The method terminates in method block 235.

FIG. 3 is a flow diagram of a method for suppressing alert messages during microphone use across a plurality of connected devices, according to some embodiments disclosed herein. In general, one or more of the devices 105, 155, 160 may be capable of implementing the method 300. In one example, various elements of the method 300 may be implemented on the first device 105. In some embodiments, the cloud computing resource 165 (see FIG. 1) may also be used to perform one or more elements of the method 300. In other embodiments the method 300 may be implemented concurrently on two or more devices 105, 155, 160.

In method block 305, an alert message is generated on a first device 105. For example, the alert message may be generated based on the alert notification application 170 identifying an incoming email, text message, telephone call, video call, or other event. The alert message may include an audio alert, a vibration alert, or a voice assist message.

In method block 310, the microphone states of all the connected devices 105, 155, 160 are evaluated to determine if any of the microphones are active. If the microphones are not active in method block 310, the alert message is executed in method block 315. In some embodiments, executing the alert message may include playing an audio tone, vibrating the device 105, or playing a voice assist message using the speaker 130 and listening for a user response using the microphone 125 (i.e., for voice assist messages that also query the user for input).

If one or more of the microphones for the connected devices are active in method block 310, the alert notification application 170 determines if the first device 105 and the connected device(s) 155, 160 with the active microphone are in the same location based on location information shared across the connected devices 105, 155, 160. The location information may include actual physical location (e.g., GPS location) or a location identifier, such as home, office, auto, etc. If the first device 105 and the connected device(s) 155, 160 are not in the same location in method block 320, the alert message is executed in method block 315.

If the first device 105 and the connected device(s) 155, 160 are in the same location in method block 320, the alert message is suppressed in method block 325. In some embodiments, the method terminates in method block 330 after the alert message is suppressed. This optional termination is indicated by the dashed line to method block 330. In other embodiments, suppressing the alert message includes queueing the alert message in method block 335 (i.e., in the alert message queue 170 of FIG. 1). In embodiments, where multiple devices 105, 155, 160 are implementing the method 300, each device 105, 155, 160 may queue its own alert messages, or a shared queue may be used. For example, the cloud computing resource 165 may receive the queued alert messages from each of the devices 105, 155, 160 and implement a shared queue.

The usage state of the microphones of the proximal connected devices are monitored in method block 340 until they becomes inactive. The microphone activity state and the physical location elements are combined into the monitoring as indicated by the proximal identifier. For example, the state information used for method blocks 310 and 320 may be combined into method block 340. During the monitoring, other ones of the connected devices 155, 160 may have their microphones become active and may move into or out of the same physical location as the first device 105. The monitoring of method block 340 covers all of the connected device microphone states and their locations. Other new incoming alert messages may also be stored in the queue 170 during the monitoring of method block 330. The proximal microphone states of the connected devices 155, 160 may be monitored periodically (e.g., every N seconds).

When all of the proximal microphones are detected as being inactive in method block 340, any alert messages in the queue 170 are executed in method block 345. In some embodiments, the user may be queried after the proximal microphone states are is determined to be inactive in method block 340 as to whether the queued alert messages should be executed immediately or held for an additional time period. A delay may be inserted between the queued alert messages as they are executed to allow for the user to be queried addressed according to the input (e.g., for voice assist messages). The method terminates in method block 350.

Suppressing and/or queueing alert messages based on the microphone state of the device or other connected devices enhances user privacy and reduces interference with a user's current activity. Private aspects of the incoming alert messages will not be communicated to other individuals participating in a call or video conference with the user. Alert messages will not be inadvertently recorded by a video application currently using the microphone.

In some embodiments, certain aspects of the techniques described above may implemented by one or more processors of a processing system executing software. The methods 200, 300 described herein may be implemented by executing software on a computing device, such as the processor 115 of FIG. 1, however, such methods are not abstract in that they improve the operation of the devices 105, 155, 160 and the user's experience when operating the devices 105, 155, 160. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes generating an alert message in a device. The device is one of a plurality of connected devices. The alert message is suppressed in the device responsive to a state of a microphone of any of the plurality of connected devices indicating an active state.

A device includes a microphone, a speaker, and a processor coupled to the microphone and the speaker. The processor is to generate an alert message and suppress the alert message responsive to a microphone state of any of a plurality of connected devices including the device indicating an active state.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   generating an alert message in a device, the device being one of a plurality of connected devices;
   suppressing the alert message in the device responsive to a state of a microphone of any of the plurality of connected devices indicating an active state; and
   executing the alert message on the device responsive to identifying the state of the microphone of at least a subset of the plurality of connected devices in a common location indicating an inactive state.

2. The method of claim 1, wherein suppressing the alert message comprises:
   queuing the alert message; and
   executing the queued alert message on the device responsive to identifying the states of the microphones in the plurality of connected devices indicating inactive states.

3. The method of claim 2, wherein executing the queued alert message comprises executing the queued alert message on a speaker of the device.

4. The method of claim 3, wherein the queued alert message comprises a voice assist message and the method further comprises and monitoring the microphone for a user response.

5. The method of claim 4, wherein executing the queued alert message further comprises voicing content associated with the voice assist message on the speaker responsive to the user response.

6. The method of claim 5, wherein the content comprises one of a text message or an email message.

7. The method of claim 4, wherein the alert message comprises an incoming communication request, and executing the queued alert message further comprises contacting an initiator of the incoming communication request responsive to the user response.

8. The method of claim 3, further comprising querying the user prior to executing the queued alert message.

9. The method of claim 1, further comprising queuing a plurality of alert messages during a time period that the states of the microphones in the plurality of connected devices indicate at least one active state.

10. The method of claim 1, further comprising:
suppressing the alert message in the device responsive to the state of the microphone of a selected one of the plurality of connected devices indicating an active state and being in a common location with the device.

11. A device, comprising:
a microphone;
a speaker; and
a processor coupled to the microphone and the speaker, wherein the processor is to generate an alert message, suppress the alert message responsive to a state of a microphone of any of a plurality of connected devices including the device indicating an active state, and execute the alert message on the device responsive to identifying the state of the microphone of at least a subset of the plurality of connected devices in a common location indicating an inactive state.

12. The device of claim 11, wherein the processor is to queue the alert message and execute the queued alert message on the device responsive to identifying the states of the microphones in the plurality of connected devices indicating inactive states.

13. The device of claim 12, wherein the processor is to execute the queued alert message on a speaker of the device.

14. The device of claim 13, wherein the queued alert message comprises a voice assist message and the processor is to monitor the microphone for a user response.

15. The device of claim 14, wherein the processor is to voice content associated with the voice assist message on the speaker responsive to the user response.

16. The device of claim 15, wherein the content comprises one of a text message or an email message.

17. The device of claim 14, wherein the alert message comprises an incoming communication request, and the processor is to contact an initiator of the incoming communication request responsive to the user response.

18. The device of claim 13, wherein the processor is to query the user prior to executing the queued alert message.

19. The device of claim 11, wherein the processor is to queue a plurality of alert messages during a time period that the states of the microphones in the plurality of connected devices indicate at least one active state.

20. The device of claim 11, wherein the processor is to suppress the alert message in the device responsive to the state of the microphone of a selected one of the plurality of connected devices indicating an active state and being in a common location with the device.

* * * * *